United States Patent
Keshner et al.

(10) Patent No.: US 11,424,445 B1
(45) Date of Patent: Aug. 23, 2022

(54) SOLID-STATE RECHARGEABLE LITHIUM BATTERY WITH SOLID-STATE ELECTROLYTE

(71) Applicants: Marvin S Keshner, Sonora, CA (US); Erik Garth Vaaler, Redwood City, CA (US)

(72) Inventors: Marvin S Keshner, Sonora, CA (US); Erik Garth Vaaler, Redwood City, CA (US)

(*) Notice: Subject to any disclaimer, the term of this patent is extended or adjusted under 35 U.S.C. 154(b) by 0 days.

(21) Appl. No.: 17/334,762

(22) Filed: May 30, 2021

(51) Int. Cl.
| | |
|---|---|
| *H01M 4/58* | (2010.01) |
| *H01M 10/0525* | (2010.01) |
| *H01M 4/36* | (2006.01) |
| *H01M 4/46* | (2006.01) |
| *H01M 4/38* | (2006.01) |
| *H01M 4/02* | (2006.01) |

(52) U.S. Cl.
CPC .......... *H01M 4/366* (2013.01); *H01M 4/382* (2013.01); *H01M 4/463* (2013.01); *H01M 4/58* (2013.01); *H01M 10/0525* (2013.01); *H01M 2004/021* (2013.01)

(58) Field of Classification Search
CPC ...... H01M 4/366; H01M 4/382; H01M 4/463; H01M 4/58
See application file for complete search history.

(56) References Cited

U.S. PATENT DOCUMENTS

| | | | |
|---|---|---|---|
| 10,658,702 B2 | 5/2020 | Li | |
| 10,763,550 B2 | 9/2020 | Hasegawa | |
| 10,770,745 B2 | 9/2020 | Wang | |
| 10,910,666 B2 | 2/2021 | Ose | |
| 10,944,128 B2 | 3/2021 | de Souza | |
| 10,985,407 B2 | 5/2021 | Nagasi | |
| 2010/0086461 A1* | 4/2010 | Chung | H01M 4/5825 423/306 |
| 2014/0093786 A1* | 4/2014 | Ito | H01M 4/131 429/322 |
| 2015/0255794 A1* | 9/2015 | Choi | H01M 4/625 429/221 |
| 2015/0311510 A1* | 10/2015 | Yoshida | H01M 4/5825 429/221 |

(Continued)

OTHER PUBLICATIONS

Aravindan et al., Journal of Materials Chemistry A, 2013, 1(11), 3518-3539. (Year: 2013).*

*Primary Examiner* — Zhongqing Wei
(74) *Attorney, Agent, or Firm* — Shalini Venkatesh (57) ABSTRACT

A lithium battery includes a solid cathode and a solid electrolyte (SSE), wherein a structurally continuous block of material comprises the solid cathode and the SSE. The structurally continuous solid block of material has a first chemical composition in the solid cathode and a second chemical composition, different from the first chemical composition, in the SSE. The SSE overlies the solid cathode, without any physical separation or interface therebetween. A method for fabricating a lithium battery includes placing a first layer of particles of an electrolyte material of a first composition on top of a second layer of particles of a cathode material of a second composition, forming a stack; and compressing and heating the stack of first and second layers to form a continuous solid material. The formed material has a solid electrolyte (SSE) characterized by the first composition and a solid cathode characterized by the second composition.

14 Claims, 4 Drawing Sheets

(56) References Cited

U.S. PATENT DOCUMENTS

2016/0211517 A1* 7/2016 Beck .................... H01M 4/505
2017/0170467 A1* 6/2017 Miki ................... H01M 4/5825
2017/0358816 A1* 12/2017 Sugiura ............. H01M 10/0562

* cited by examiner

SOLID-STATE RECHARGEABLE LITHIUM BATTERY WITH SOLID-STATE ELECTROLYTE

FIELD OF INVENTION

This invention relates in general to rechargeable lithium batteries, and more specifically to solid-state lithium batteries, in which the material inside the battery that separates the battery anode and cathode, and that allows ion conduction while blocking electron conduction, is a solid (or solid-state) material, rather than a liquid or paste electrolyte.

BACKGROUND

Rechargeable batteries with lithium as one of the active elements have found widespread use in cellphones, computers, power tools, and, now, electric vehicles. In spite of their somewhat lower energy per weight and volume, lithium batteries with lithium iron phosphate ($LiFePO_4$) cathode electrodes have found particular favor for their lower likelihood of catching fire, and for their long lifetime, coping with many recharge cycles, and offering years of reliable operation.

Figure 1:
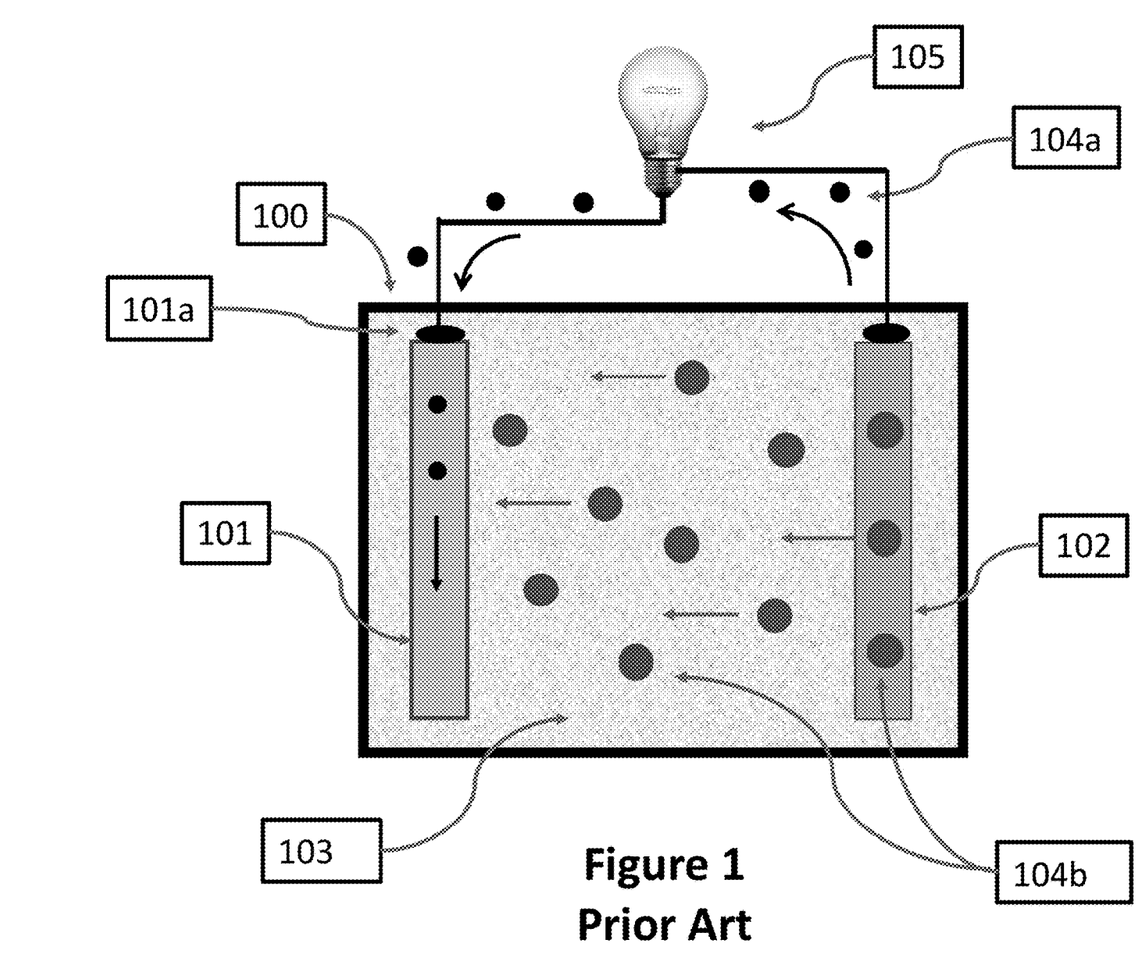
FIG. 1 is an illustration of a typical prior-art commercial lithium battery, shown in cross-section.

A typical $LiFePO_4$ battery is constructed and works as follows. The battery (100) comprises a $LiFePO_4$ cathode (101), a carbon anode (102), and a liquid electrolyte (103). When the battery is being charged, the cathode gains positive charge and the anode gains negative charge. When an electric circuit (105) is connected to a charged battery, electrons (104a) flow from the battery anode (102), through the circuit, back into the battery's cathode contact (101a), and, finally, into the depths of the cathode material. Deep inside the $LiFePO_4$ cathode (101), the electrons react with iron atoms (Fe3+) and reduce their oxidation state from $Fe^{3+}$ to $Fe^{2+}$. Simultaneously, lithium ions (104b) that are stored in the anode between layers of graphite are released. They flow inside the battery, through the liquid electrolyte (103) between the cathode and anode, and move to the locations in the cathode, where the electrons have arrived. Both electrons and ions must move into the cathode for the battery to preserve electrical charge neutrality. If either the electron conductivity into the cathode through the external circuit or ion conductivity into the cathode through the electrolyte is not good, the battery will not function well.

The liquid electrolyte in a conventional battery, and the solid-state electrolyte (SSE) in a solid-state battery, play a key role. Whichever is used must conduct ions well, while blocking the conduction of electrons almost completely. The electrolyte prevents the electrons from flowing between the anode and cathode inside the battery. Instead, electrons are forced to flow outside the battery and through the external electric circuit. The electrolyte assures that the chemical energy, stored in the battery, is converted into electrical energy when the battery is connected to an outside circuit. If electrons could flow through the electrolyte, the battery would self-discharge and all of the chemical energy stored in the battery would be consumed as internal heat.

Unfortunately, the liquid electrolyte used in conventional lithium batteries has a number of serious disadvantages. Since the voltage created by a lithium battery is high enough to decompose water, the liquid electrolyte cannot be a water solution with dissolved lithium salts to conduct lithium ions between the anode and cathode. Instead, it is usually a mixture of methyl and ethyl carbonate, in which lithium salts are dissolved. Although this combination works well as an electrolyte, it decomposes at a moderately low temperature, producing methane or ethane gas, both of which are highly flammable. Hence, when lithium batteries, especially those with $LiCoO_2$ cathodes, are overcharged or heated, they can experience thermal runaway that quickly elevates the battery temperature, decomposes the electrolyte, ruptures the container, ignites the flammable gases, and starts a fire.

Another drawback is that liquid electrolytes have difficulty supporting high charging rates. For electric vehicles, the desired charging time is 15 minutes or less for a full charge. Most current lithium batteries cannot sustain this rate or can sustain it only with a serious loss of capacity and reduced lifetime. Most commercial lithium batteries require the charging time for a full charge to be at least one hour, and prefer a two-hour charge to protect capacity and lifetime. Unfortunately, for future electric car drivers, away from home, waiting an hour or more at a re-fueling stop is not attractive.

For safety reasons alone (to avoid the serious consequences of overcharging, operating at high temperatures, discharging too quickly or mechanically stressing the battery) there is, therefore, a strong desire to replace the liquid electrolyte with a solid material (a solid-state electrolyte) that performs the same function of conducting lithium ions, while blocking conduction of electrons. There are also other reasons. The anode in most lithium batteries is graphite, which during charging, accepts lithium ions and stores them between the layers of graphite, with six carbon atoms required for every lithium ion. This carbon electrode is flammable and adds to the fuel content within the battery, once a fire starts. In addition, the carbon electrode adds significant weight and volume to the battery.

Ideally, lithium metal could be used instead of carbon to make up the anode. It is very light and requires little space. However, a lithium metal anode is not compatible with current liquid electrolytes. The lithium metal will react with the liquid electrolyte and decompose it.

A solid electrolyte (aka solid-state electrolyte or SSE) to be used with a lithium metal anode must have the following features: its conductivity for lithium ions must be high and its conductivity for electrons must be very low. In addition, since it is in contact with the cathode material as well as with the lithium metal anode, it must present a stable interface at both contacts. The three materials and the interfaces between them must be stable chemically, must not deteriorate over time or with charge-discharge cycling, and must present a low contact resistance for ionic conduction. A liquid electrolyte can easily conform to a cathode or anode that is rough, porous, or textured, like current ($LiFePO_4$) electrodes, but an SSE requires either the joining of very flat surfaces, or some form of conductive paste between surfaces. Otherwise, a mechanically reliable connection with high conductivity for lithium ions is unlikely.

If the SSE and the $LiFePO_4$ cathode are pressed together and have different volume expansion with changes in temperature or during charging and discharging, a mechanical stress will be introduced at the interface that can crack the materials. If lithium metal is used as the anode, the SSE must discourage the formation of lithium metal dendrites that can penetrate into the SSE, and short circuit and/or crack the SSE.

A number of candidate materials have been and are being investigated to meet the requirements necessary for a successful SSE. To date, no SSE has met all of the requirements noted above. One challenge is the difference in the SSE's thermal expansion and contraction during cycling, compared with that of a $LiFePO_4$ cathode. Another is the need to make intimate contact with ($LiFePO_4$) which is currently deposited as an emulsion of carbon-coated particles, with a rough surface, that is then calendared and compressed. Yet another is the ability of the SSE material to prevent penetration by lithium dendrites, and thus to avoid being short circuited or cracked by their formation. In many cases, the lithium-ion conductivity is too low, the electron conductivity is too high, the mechanical stability is insufficient, the material is too soft or too hard, and the lifetime, especially at higher operational temperatures, is too short.

There is, therefore, a need for an SSE material that is well-matched to the mechanical and thermal properties of various cathode materials like $LiFePO_4$, or other lithium, transition-metal phosphates, that can form an intimate contact with the cathode material, can provide low resistance for ionic conduction, and can provide very high resistance for electron conduction. In addition, there is a need for an SSE material that also resists the formation of lithium metal dendrites, and has a long lifetime after many charge-discharge cycles, at high rates (such as a full charge in 15 minutes).

SUMMARY

Embodiments generally relate to apparatuses and methods for making a solid-state lithium battery, in which the cathode and the solid-state electrolyte (SSE) are made of solid materials that are fabricated together as a structurally continuous block of material, with a continuous and integral contact between the portion of the block which will function as the battery cathode and the portion which will function as the SSE.

In some embodiments, the major constituent of the block comprising the cathode and the SSE is $LiMPO_4$, where M is one element, or a combination of elements, from among: Ti, V, Cr, Mn, Fe, Co, Ni, Cu, and Zn. The element or combination of elements M present in the cathode portion may be different from the element or combination of elements M present in the SSE portion, but the SSE and cathode are still parts of a continuous material, with no physical boundaries between the cathode and the SSE. Since the cathode and the SSE are made from a continuous material, with no gaps, no mechanical interfaces, and minimal thermal or cycling expansion mismatches between significantly dissimilar materials, the tough challenges of the mechanical, chemical, and electrical interface between the cathode and SSE have been addressed.

In several embodiments, low concentrations of one or more dopants are introduced during fabrication of the block, to either the portion of the block that will operate as the cathode, or to the portion that will operate as the SSE, or to both, with the particular dopants and dopant concentrations independently selected to optimize the particular properties desired of that corresponding portion.

In one embodiment, the transition region from the cathode to the SSE is graded to minimize mechanical stress from any changes in lattice parameter from one material composition to the other. This can be accomplished with a variety of well-known and published manufacturing techniques starting with powders that are strongly compressed and heated to form a high density, amorphous or multi-crystalline material, or, with an additional annealing step, to form a single crystal.

In one embodiment, a method for fabricating the cathode and SSE as a continuous material, with or without a transition layer, starts with powders of the cathode and of the SSE material. A layer of cathode powder is placed down, then (if a transition layer is included) a layer or layers of a mixture of cathode and SSE powders, and then a layer of SSE powder. All layers are then compressed, heated, and fused together simultaneously to form a continuous, high density, material with strong intimate bonding and no discernable separation between layers, wherein the SSE overlies the solid cathode. The resulting material can be an amorphous or multi-crystalline material, or, with an additional annealing step, can form a single crystal.

Unlike some prior art $LiFePO_4$ cathodes, in which the cathode material is a composite, comprised of $LiFePO_4$ particles, carbon or graphite particles, and a binding material, like poly vinylidene fluoride that holds the composite material together, in embodiments of this invention, the cathode is made up of a homogeneous material, not a mixture of several materials. In embodiments where the cathode is made by sintering particles, all of its particles have basically the same composition. In embodiments where the SSE is made by sintering particles, all of its particles have basically the same composition.

In solid-state form, $LiMPO_4$ is a good choice for an SSE. For example, both $LiFePO_4$ and $LiMnPO_4$ are known to have very low electron conductivity. They are practically insulators. In addition, their conductivity for ions is sufficient. Therefore, they meet two of the requirements for an SSE, good conduction for ions and poor conduction for electrons.

On the other hand, in solid-state form, pure $LiMPO_4$ is not a good choice for a cathode material. Its electron conductivity is too low. Unless both electrons and ions can penetrate deeply into the cathode material, the necessary chemical reactions cannot occur: $M^{2+}$ atoms cannot lose or gain electrons to transition to $M^{3+}$ and back. If either ion or electron conductivity is too low in the cathode, then both charging and discharging rates will be limited and energy will be wasted pushing ions or electrons through whatever is resisting their flow.

In current lithium batteries with liquid electrolytes, the poor electron conductivity of $LiMPO_4$ materials has been addressed in the specific case of $LiFePO_4$ by fabricating it as an emulsion of small particles with a binder. Particles of $LiFePO_4$ are mixed with conductive particles of carbon and a binder. Then, the mixture of particles is pressed together so that the carbon particles form a connected, highly conducting matrix that surrounds all of the $LiFePO_4$ particles and conducts electrons to each of them. Electrons and ions travel most of the distance into the cathode through the conductive carbon coating. Since the $LiFePO_4$ particles are small, the distance that electrons must travel within each particle is small and the resistance to electron conduction over the final distance is acceptable.

Unfortunately, this method of improving the conduction for electrons will not work well for a solid-state battery. The electron conductivity through the carbon layer is still not high enough to support charging the battery in 15 minutes or less. Also, the currently used porous mixture for the cathode—$LiFePO_4$ particles, mixed with carbon particles, and held together with a binder—will not match the thermal expansion of and interface well with a pure $LiMPO_4$ material for the SSE.

Even after rolling and calendaring, the emulsion of $LiFePO_4$, carbon and a binder is not flat. With its porous structure, it can easily be contacted by a liquid electrolyte, but intimate contact of its rough surface with a solid-state electrolyte (SSE) is challenging. The effective contact area is small when the contacting surfaces are not flat and smooth. Surface roughness creates areas of intense current concentration that create hot spots and encourage the formation of lithium dendrites.

Unlike some prior art approaches, in which layers for the cathode and SSE are simply placed on top of each other, in some embodiments of this invention, the layers that form the cathode and SSE are fused together to form a high density, continuous material with intimate bonding between layers and no discernible physical interface between layers. The cathode and SSE regions contact each other and bond to each other over their entire adjacent surfaces and not just at high points of each adjacent surface. Since the material is continuous, adhesion between layers is that of a continuous material. The high contact resistance often found between layers of materials in a stacked structure is eliminated. However, since the material is continuous, the layers cannot slide over each other to relieve stress from differences in thermal expansion or when lithium enters or exits from the material.

As an example, a clay brick, made with layers of different clays that are fired together at the same time, is a continuous material. There are no discernable interfaces between the layers. A stack of bricks, fired separately, and then placed one upon the other is not a continuous material. The bricks can slide over each other and the contact resistance between them can be high. Prior art solid-state batteries simply deposit layers on top of each other. There is no attempt to fuse the layers into a continuous block of material.

Throughout this disclosure, it should be understood that "continuous" is defined to mean that any internal layers are fused together, so that there are no discernable physical separations or interfaces therebetween. It should also be understood that although the description and claims may use perspective-based descriptions such as top/bottom, in/out, overlies/underlies, and the like, such terms are merely used to facilitate the discussion and are not intended to restrict the application of embodiments described herein to any particular orientation. For example, where a regional or layered structure is described or illustrated with material X overlying material Y, it should be appreciated that the whole structure could be formed or used in an inverted orientation, with material X now underlying material Y, without departing from the spirit of the invention.

In one embodiment, the part of the continuous $LiMPO_4$ material that is used as the cathode is doped with up to 10% of other elements to greatly increase its conductivity for electrons and/or ions. In one embodiment, the part of the continuous $LiMPO_4$ material that forms the SSE is undoped or doped differently than the cathode to increase its conductivity for ions and/or decrease its conductivity for electrons.

As presented above, M in $LiMPO_4$ must be one of, or a combination of, elements from the list above, but doping elements, especially in low concentrations, can be almost anything that will dissolve in the material or substitute in the bulk material or at the grain boundaries for the atoms of Li, M, P or O. In its undoped state, $LiMPO_4$ has sufficiently high ion conductivity and sufficiently low electron conductivity to function well as an SSE. The function of an SSE is to conduct ions, but not electrons.

In one embodiment, for the continuous material, the element(s) M and the elements for dopants are chosen to minimize volume changes, or to minimize the growth of cracks during volume changes, as lithium moves in and out of the cathode during charging and discharging. When the battery is being charged and lithium is transferred from the cathode to the anode, the $LiMPO_4$ in the cathode region would become $MPO_4$ and contract. For example, $LiFePO_4$ contracts by 7% in becoming $FePO_4$. In contrast, with its very poor electron conductivity, the SSE region does not lose its lithium and the SSE volume remains the same. This difference in volume change between the cathode region and the SSE region of the continuous material could cause sufficient mechanical stress to form cracks in the SSE and cathode regions, without this embodiment's careful selection of the element(s) M and the elements for dopants.

Finally, as the SSE, $LiMPO_4$ is well suited to work in contact with metallic lithium as the anode and eliminate the volume and weight of the graphite anode currently used. In one embodiment, the surface of the $LiFePO_4$ SSE that is in contact with metallic lithium is treated to achieve consistent and uniform wetting by metallic lithium across the entire surface. With uniform wetting, hot spots are avoided and dendrite formation is minimized. Since lithium metal is relatively soft and malleable, it does not create significant mechanical stress at the surface of the $LiMPO_4$SSE.

DETAILED DESCRIPTION

Figure 2:
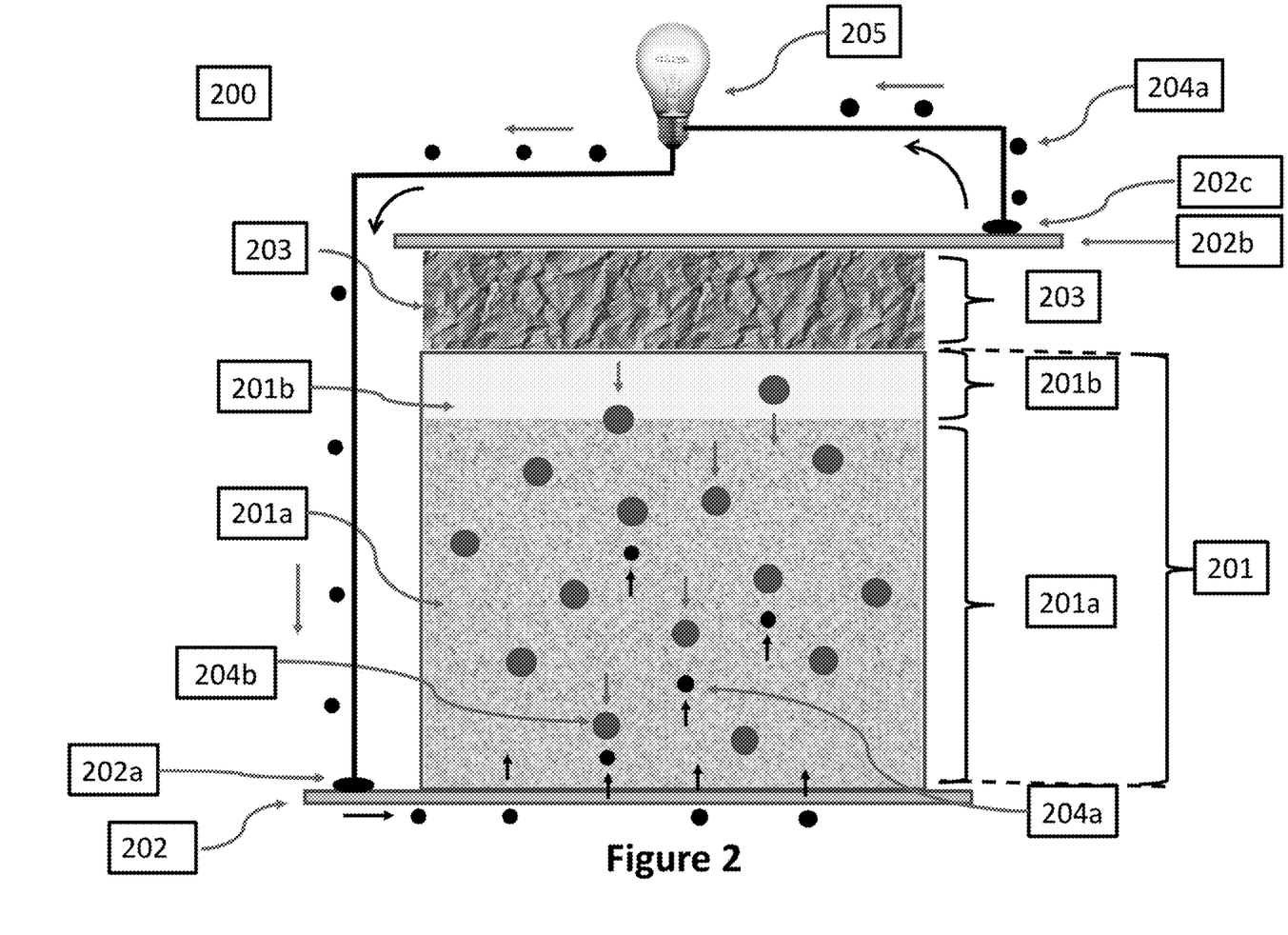
FIG. 2 is an illustration of a lithium battery according to some embodiments of the current invention, shown in cross-section.

In one embodiment, illustrated schematically in FIG. 2 (in cross-section), a solid-state lithium battery (200) is formed using a continuous block of solid material (201) which functions as both the cathode (201a) and the solid-state electrolyte (201b). The continuous block of solid material 201 is attached to a conductive substrate, such as aluminum (202). The lower portion (201a) of the continuous block 201 closest to the aluminum substrate (202), has a chemical composition (a primary molecular constituent, plus, in some cases, one or more dopants) chosen to increase its electron and ion conductivity and/or minimize the volume change when lithium exits the material during charging. This section 201a forms the cathode of the battery, with good conductivity for both ions (204b) and electrons (204a).

The upper portion of the continuous solid material is a section (201b) that forms the solid-state electrolyte (SSE). In one embodiment, its primary chemical constituents and any dopants are chosen to increase its conductivity for ions and reduce its conductivity for electrons to a very low level (close to completely insulating). In contact with the top surface of the SSE layer 201b is a layer of metallic lithium that forms the anode (203). Contacting the top surface of anode 203 is a high conductivity layer 202b, typically of aluminum like substrate 202. Contacts 202a and 202c to the aluminum substrate (202) and to the top layer of aluminum (202b) respectively allow electrons to flow from the battery into the external electrical circuit (205).

In some embodiments, the solid material is made from one or more compositions of LiMPO4, where M stands for one element, or a combination of elements, from among: Ti, V, Cr, Mn, Fe, Co, Ni, Cu, or Zn. In one embodiment, the cathode section of the LiMPO4-material is doped to increase its electron and ion conductivity, and the SSE section of the LiMPO4-material is not doped and retains its normally very low electron conductivity.

In one of the $LiMPO_4$ embodiments, M=Fe in the cathode and in the SSE. The cathode section is doped LiFePO4-material and the SSE section is undoped $LiFePO_4$ material.

In another embodiment, where M is Fe in the cathode section and a combination of Fe and Mn in the SSE section, the cathode section is doped $LiFePO_4$ and the SSE section is undoped $LiMn_xFe_{(1-x)}PO_4$, where $0 \le x \le 1$. Undoped $LiMPO_4$ has a 4 times lower electron conductivity than undoped LiFePO4, circa 10^-9 S/cm at room temperature. However, its ion conductivity may be a little too low, depending on the application. It also has a slightly different lattice volume than $LiFePO_4$, about 3% larger.

In various embodiments, the dopant is one element, or a combination of elements, selected from a list that includes: Na, Ca, Mg, Zn, Cu, Ti, Cr, V, Mn, Co, Zr, Y, Al, Ga, Si, Ge, Sn, Nb, Mo, Sm, Eu, Yb, C, N, F, Cl, S or any other elements that will not make the material chemically unstable. Many dopants incorporated into $LiMPO_4$ have been found to result in an increase in the electron and ion conductivity.

In one embodiment, doping elements for the cathode region are chosen that will partially substitute for the M atoms in $LiMPO_4$, and whose ionic radius is the same or smaller than the ionic radius of $M^{2+}$. For example, the ionic radius of Fe2+ is 78 pm, while the ionic radius of Mg2+ is 72 pm. A doping of 5% of Mg in $LiFePO_4$ has been found to improve the ion conductivity by 4 times and improved the electron conductivity by 50,000 times. With 5% Mg doping, the conductivity for ions and electrons became approximately equal. It is important to improve the ion conductivity to support fast charging and discharging, but it is essential to dramatically improve the electron conductivity in the cathode region for the battery to function at all. The doping must change $LiMPO_4$ from an electron insulator to an electron conductor. When charging or discharging at high rates, good conductivity is required for both ions and electrons.

In one embodiment, doping elements are chosen that favor higher oxidation states than 2+, like $Cr^{3+}$, $V^{3+}$, $Ti^{4+}$ or $Zr^{4+}$. With their higher oxidation states, these elements create electrons or holes that enhance the electron conductivity of $LiMPO_4$. In one embodiment, doping elements are chosen from among fluorine (F—) and other anions that can substitute for oxygen atoms, whose oxidation state is 2-($O^{2-}$) and improve the electron and/or ion conductivity. In one embodiment, Si atoms are substituted for P atoms. Finally, in one embodiment, doping elements are a combination of elements, with a smaller ionic radius, like Mg, and/or a higher oxidation state, like V3+, and/or a lower oxidation state than the ions they replace, like F— or $Si^{4+}$.

In one embodiment, the amount of doping in either the cathode or SSE section is limited to 10%. In many experiments, too much doping has been found to be counterproductive. Depending on the element chosen, best results are often obtained with a few percent of the element doped into $LiMPO_4$. When combinations of elements are chosen, best results are often obtained when the total concentration of the multiple dopants is less than 10%.

In $LiFePO_4$, and most $LiMPO_4$ materials, lithium ions travel through channels along the b-axis of the crystal. In one embodiment, dopants like $Mg^{2+}$, with ionic radii smaller than $Fe^{2+}$ ions, and F— with ionic radii smaller than $O^{2-}$ ions, act upon the $LiFePO_4$ crystal structure to create lithium vacancies, lower the activation energy for lithium-ion movement, and thus increase the Li-ion conductivity. In addition, the choice of the element or elements, M, in $LiMPO_4$ can change the conductivity for lithium ions and also the volume change, when lithium exits the material.

Usually, dopants are considered to be elements that enter the lattice of a crystal and substitute for atoms in the crystal. In one embodiment, the dopants chosen do not enter the crystal, instead they accumulate at the grain boundaries of the crystallites and increase the conductivity of the entire crystallite by greatly increasing the electron and/or ion conductivity of the grain boundaries.

In one embodiment, the cathode region is made with a composite material made with particles, of a doped or undoped material, that are coated with some form of conductive material, such as graphite, lithium, or a conductive metal oxide. The SSE region is also made with particles, but without the conductive coating. Layers of the two materials are compressed, heated, and fused together to form a continuous solid material without a physical separation between the cathode and the SSE. The materials, the doping, and the conductive coating are chosen so that the thermal expansion of the cathode region is similar to the thermal expansion of the SSE region.

In some embodiments, the continuous material for the cathode and SSE is fabricated by the following method. Doped or undoped, coated or uncoated powders are produced for the cathode and for the SSE regions, with particle dimensions of 1 μm or less. The powder for the cathode region is placed down as a layer, then the powder for the SSE region is placed down in a layer on top of the first layer. If a transition layer is desired, it is placed on top of the first layer and then the SSE layer is placed on top of the transition layer. Finally, all layers of powder are compressed and heated together at the same time until they fuse to form a dense, continuous material. Material originally placed at the bottom stays at the bottom and material originally placed at the top stays at the top. Where the layers of powder meet, the final, dense, continuous material will transition smoothly from the material of one layer to the material of the next with no discernable separation or interface between the layers, and with complete and continuous contact between the layers.

In some prior art $LiFePO_4$ cathodes, the cathode material is a composite, comprised of 3 different materials: $LiFePO_4$ particles, carbon or graphite particles, and a binding material, like poly vinylidene fluoride, that holds the composite material together. In various embodiments of this invention, the continuous material that contains both the cathode and the SSE is not a composite. The cathode and SSE sections are both homogeneous materials. A cross-section through either of them will reveal a material with a uniform composition. If made with particles, all particles in either the cathode or the SSE are of the same material composition and are sintered together, not held together by a binder.

In one embodiment, to minimize possible cracking of the solid material from internal stress, the boundary between the cathode and the SSE sections is graded by transitioning slowly from 100% of the cathode powder to a mixture, and then, to 100% of the SSE powder. After the powder layers are placed down, then they are compressed, heated and fused together to form a continuous material. A graded interface will spread any internal mechanical stress over a larger thickness of the continuous, solid material.

Doping and grading as part of a continuous $LiMPO_4$ material is easily accomplished. In one embodiment, $LiMPO_4$ material is formed from precursors that are ground and heated to form small particles of the final material. Doping is achieved by forming the small particles of $LiMPO_4$ from a mixture of several chemicals that include the dopant as an oxide (eg. MgO), a phosphate (eg. $MnPO_4$), an oxalate (eg. $MgC2O_4$), a lithium compound (eg. LIE), etc. After the doped powders are created, they are then layered, compressed and heated together to create the final, dense $LiMPO_4$ material.

In $LiMPO_4$ materials, lithium-ion conduction is along the b-axis of the crystal or crystallites. In one embodiment, the $LiMPO_4$ material is either a single crystal or multi-crystalline with crystallites. The crystal or crystallites are oriented so that the b-axis is perpendicular to the surface and aligned with the direction of lithium-ion flow. In one embodiment, during fabrication, the powders are compressed and heated in the presence of a strong magnetic field to orient the b-axis. Ions and electrons are conducted one-dimensionally in $LiMPO_4$ along the b-axis. Aligning the b-axis with the current flow will improve conductivity, especially for ions.

Changes in volume of $LiMPO_4$ during charging and discharging can cause cracks in the material that degrade its capacity with each cycle. For example, in $LiFePO_4$, the a, b, and c axes expand and contract by +4%, +4%, and −2%, respectively, when lithium exits and the material becomes $FePO_4$. In one embodiment, with the b-axis oriented perpendicular to the surface, the direction of the a and c axes in multiple crystallites are oriented randomly in the direction parallel to the surface. Thus, the expansion parallel to the surface is the average of the expansion of the a and c axes, when lithium exits.

In the continuous material that contains both the SSE and the cathode, the SSE region remains fully lithiated, while the cathode region changes from $LiMPO_4$ to $MPO_4$ and back again, during charging and discharging. The electron conductivity of the SSE is so low that no redox reactions can occur in a reasonable time frame ($M^{2+} \leftarrow\rightarrow M^{3+}$), and the material remains $LiMPO_4$.

When the battery is fully charged, the cathode is $MPO_4$ and the SSE is $LiMPO_4$. At the transition region between the cathode and SSE, there are shear stresses caused by the differences in volume expansion. For $LiFePO_4$, the Young's modulus is circa 124 GPa, the bulk modulus is circa 94 GPa, and the shear modulus is circa 48 GPa. The material is a ceramic, with a high shear modulus, and the effect of the volume change gets spread over a large thickness, compared with the total thickness of the continuous material.

When the battery is fully charged, in a direction parallel to the top or bottom surface (as viewed in FIG. 2) of the battery, the SSE will experience a compressive stress trying to decrease its dimensions parallel to the top or bottom surface, and the cathode region, which is typically much larger than the SSE region, will experience a much smaller tensile stress in the same directions. As the battery discharges, and both materials become fully lithiated, these stresses will decrease toward zero. In the direction normal to the surface, the material just contracts and expands. At any level in the thickness of the material, there is no difference in the contraction or expansion. Thus, there is no stress perpendicular to the surface.

In both the SSE and the cathode region, the continuous $LiMPO_4$ material will expand and contract. Since this material is a ceramic, since the expansion or contraction throughout the continuous material is large (1-2%), and since the stresses are high, like all ceramics, $LiMPO_4$ material can form cracks. During discharging, metallic lithium can accumulate in the cracks, rather than re-enter the $MPO_4$ material and re-form $LiMPO_4$. Lithium stuck in the cracks becomes unavailable for future charge-discharge cycles, thus reducing the capacity of the battery. It is the redox reaction of $LiMPO_4$ on one side of the separator with lithium metal on the other side that creates the battery. Lithium metal on both sides does nothing. Lithium metal in the cracks is called "dead lithium". It is no longer part of the battery capacity.

There are a number of ways to minimize the formation of cracks. In one embodiment, the $LiMPO_4$ material forming the cathode and the SSE, with a metallic lithium anode on top is divided into islands, in the direction parallel to the surface, with a compliant, insulating material between the islands. This is analogous to a concrete sidewalk, in which the concrete is divided into sections, that are separated by a compliant material that allows each section to expand or contract. Expansion or contraction of the $LiMPO_4$ material parallel to the top surface is absorbed by the compliant material between islands. Expansion or contraction of the $LiMPO_4$ and/or the metallic lithium anode perpendicular to the surface is allowed by the open space above the SSE.

Figure 3:
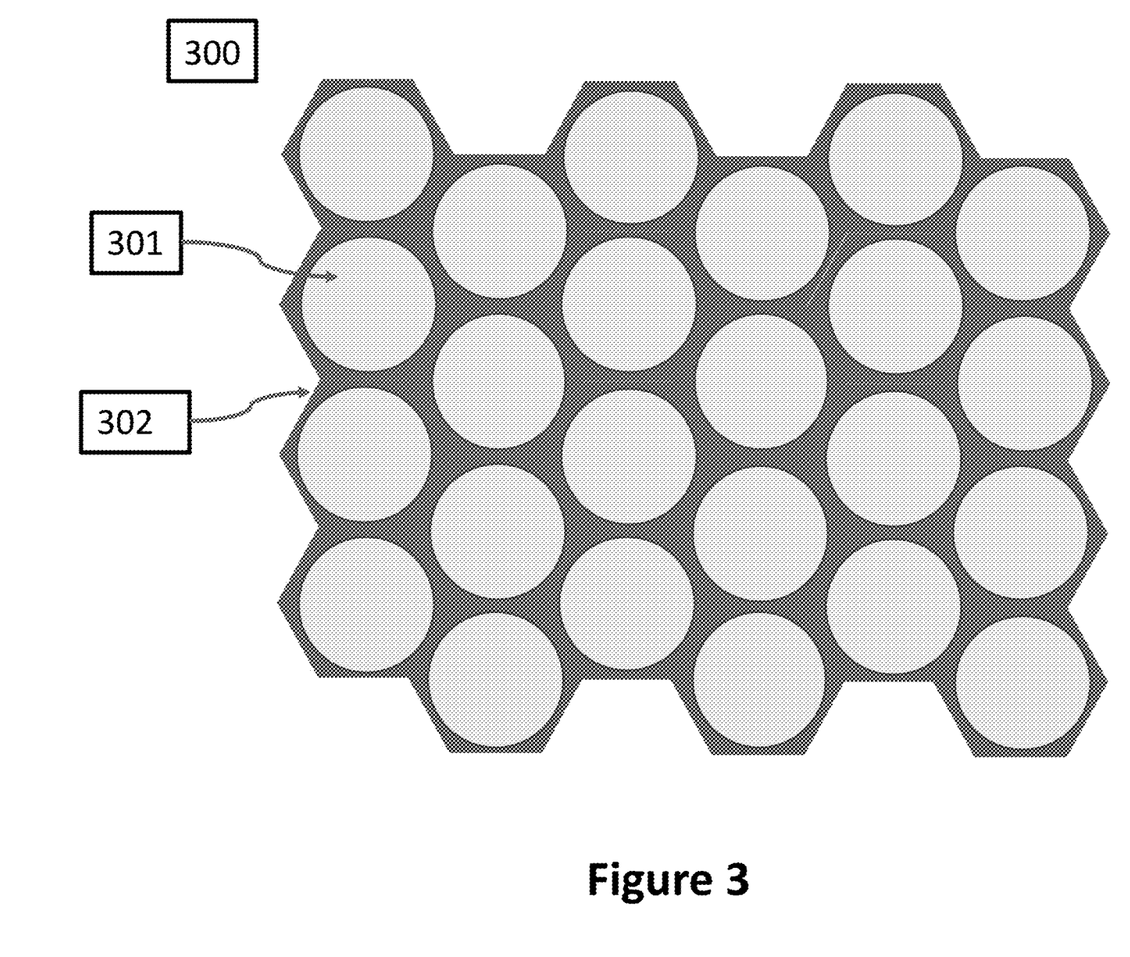
FIG. 3 is an illustration of a lithium battery according to some embodiments of the current invention, shown in a top-down view, where the vertically continuous solid-state battery material is broken into islands with a soft material between the islands to allow for volume expansion.

In one embodiment, illustrated as a top-down view in FIG. 3, a lithium battery (300) comprises many islands. In one embodiment, each island (301) comprises a block of material with both cathode and SSE regions, and a layer of metallic lithium anode material above the SSE layer. Separating these islands is an insulating, compliant material (302), that is easily stretched or compressed.

In one embodiment, the insulating, compliant material 302 is fabricated pre-compressed so that when the $LiMPO_4$ loses lithium, becomes $MPO_4$, and contracts, the separating material between islands expands and fills any gaps. Thus, the island separating material maintains close contact with the sides of the cathode plus SSE and prevents any lithium metal from the anode from flowing around the side of the SSE material and contacting the side of the cathode material.

In one embodiment, the island separating material 302 is poly vinylidene fluoride (PVDF) or another compressible fluorinated polymer. The compliant and chemically inert, PVDF allows the cathode, SSE and anode materials to expand or contract. With fluorine atoms at its surface, PVDF is nicely wet by lithium metal.

Figure 4:
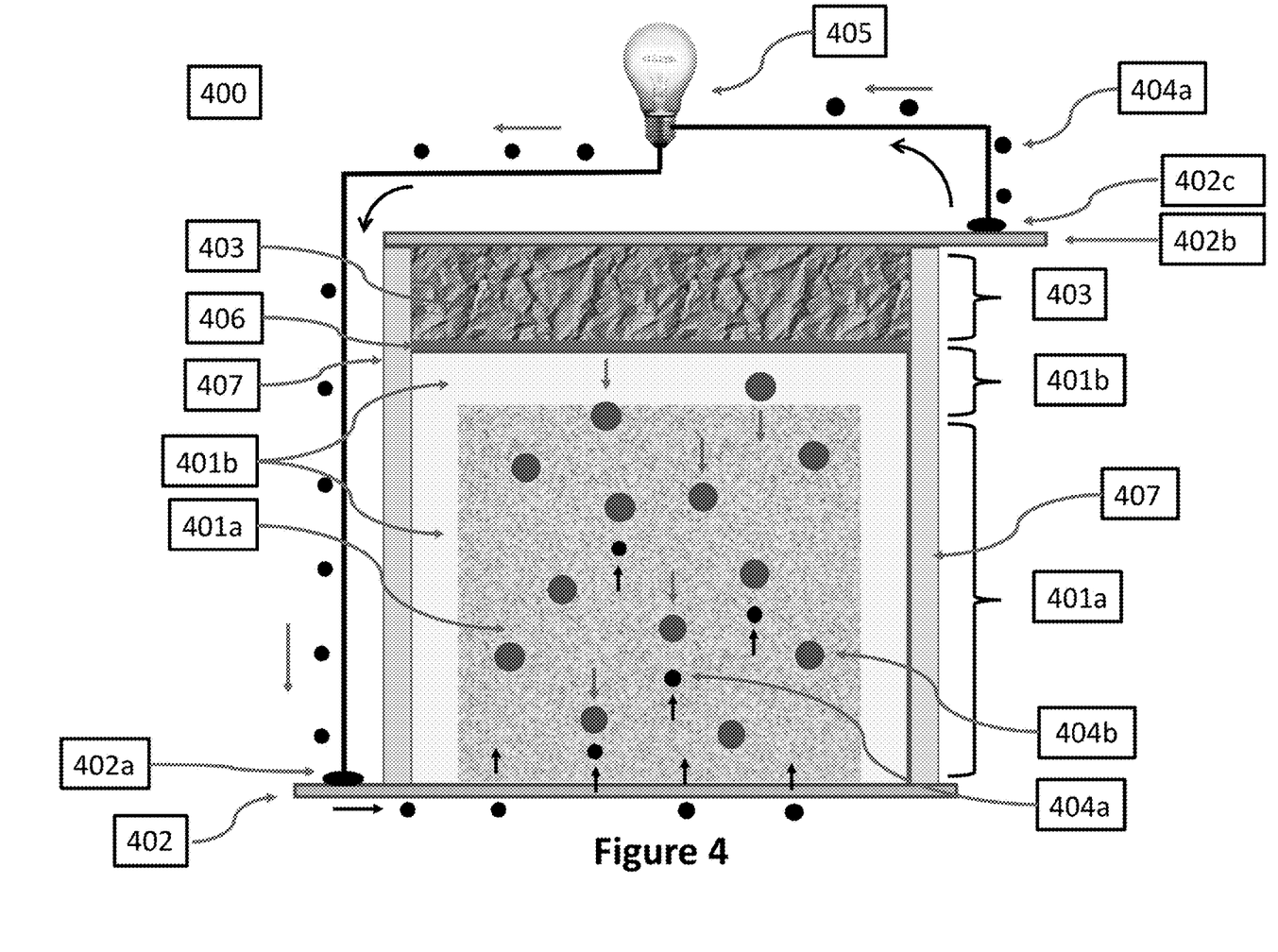
FIG. 4 is an illustration of a lithium battery according to embodiments of the current invention, shown in cross-section. showing the construction of a solid-state battery, with the cathode, solid-state electrolyte (SSE), and the lithium metal anode, and with a protective coating on the SSE.

Illustrated in FIG. 4 is the battery 400, similar to battery 200 as shown in FIG. 2 (in cross-section), but with the addition of the island separating material (407) surrounding the continuous material that contains both cathode and SSE regions, and the anode material. It prevents lithium metal from migrating down the sides and contacting the cathode or the aluminum below the cathode (402). Also shown are the bottom aluminum contact (402a) to the aluminum that contacts the cathode (402) and the top aluminum contact (402c) to the aluminum or other metal (402b) contacting the lithium anode (403). External circuit 405, electrons 404b and ions 404a are shown, corresponding to elements 205, 204b and 204a in FIG. 2.

In one embodiment, the SSE material is on top of the cathode and also on the sides. This is illustrated in FIG. 4, where the SSE (401b) is shown both on top and on the sides of the cathode (401a). Surrounding the cathode material with SSE on the sides, except for the cathode contact to the bottom aluminum (402), provides added protection against electrons moving down the sides of an island in any gaps that may exist between the island of solid cathode/SSE material and the compliant material between the islands. As described previously, in another embodiment, the SSE layer is only on top of the cathode and the complaint material between islands is pre-compressed to eliminate any gaps through which electrons or lithium metal could flow around the SSE layer and directly contact the cathode layer.

In one embodiment, the island separator material (407) extends above the SSE and forms a compartment to contain the lithium metal anode, that expands and contracts to fill or empty the compartment during charging and discharging. The aluminum substrate below the cathode region (402) and the aluminum (402b) that contacts the lithium anode (403) are continuous and connect all islands. Both the top and bottom aluminum layers contact and seal against the island separator material.

In one embodiment, the sides of the separator material above the SSE layer are coated with lithium, magnesium, or aluminum metal. In one embodiment, the separator material above the SSE is replaced with a conductive material, such as aluminum, that forms a compartment for lithium metal. In another embodiment, the island separator material extends only to the top of the SSE layer. The lithium metallic anode (403) and the top aluminum contact (402b) are continuous over the top of the separator material and connect all islands.

In one embodiment, the cathode and the SSE sections are both made from $LiMPO_4$ materials that have coefficients of thermal expansion that are close to each other. Thus, differential volume changes between the cathode and SSE sections with temperature changes are minimized. In one embodiment, volume changes in $LiMPO_4$ during charge-discharge cycles are minimized by choosing the element or combination of elements for M that minimize volume changes. In one embodiment, doping elements are chosen that also minimize volume changes during charge-discharge cycles.

In one embodiment, prior to compressing and heating the powder particles to form the continuous material for the cathode and SSE, the particles are coated to lubricate the grain boundaries in the final material and allow it to expand and contract along the grain boundaries with less tendency to form cracks. In one embodiment, the powder particles for the cathode region are coated with a very thin layer (circa 1 nm) of extra lithium metal that will collect at and lubricate the grain boundaries. In one embodiment, the powder particles for the cathode region are coated with a very thin layer of graphite (circa 1 nm) that will collect at and lubricate the grain boundaries. In one embodiment, the powder particles for the SSE region are coated with a thin layer of an insulating coating that conducts lithium ions, but not electrons, like LiF (1-2 atomic layers).

In one embodiment, the SSE section of the continuous material is undoped $LiFePO_4$ or undoped $LiMPO_4$, and the cathode section is doped $LiFePO_4$. In one embodiment, the SSE is a 5 μm thick layer of $LiMPO_4$ with a resistance for electrons of 0.5 meg ohms for a surface area of 1 cm2. This resistance is high enough to slow the self-discharge of the battery to an acceptable level for most applications.

In one embodiment, the cathode section is a doped $LiFePO_4$ material, 100 μm thick, and the SSE section is undoped $LiMPO_4$, 5 μm thick. With a dense $LiFePO_4$ material, (approaching 3.6 g/cm3), the capacity of the cathode section is 6 mA-hours per square cm. The self-discharge current is 7.4 μA and the time to self-discharge the capacity of the battery through the SSE would be about 33 days.

Although 33 days is not an exceptional value for the self-discharge time, it is sufficient for many applications, including electric vehicles. Also, $LiMPO_4$ materials will have lower ion conductivity at low temperatures and may require a warm up before charging or discharging at high rates. Again, this is acceptable for many applications, including electric vehicles. These modest disadvantages are a small compromise in return for an interface between the cathode and SSE that provides excellent mechanical reliability, excellent chemical stability, and excellent ion conductivity, features that are essential to obtain a solid-state battery with high charge and discharge rates.

In other embodiments, the SSE is doped to further reduce its electron conductivity or increase its ion conductivity. In the literature, there is some evidence that small amounts of doping with tri-valent ions like $Al^{3+}$, $Ti^{3+}$ or $Ga^{3+}$ will lower the hole concentration in $LiMPO_4$, reduce its electrical conductivity, and increase ion conductivity.

However, while there has been much work to make $LiFePO_4$ and related materials (like $LiCoPO_4$ or $LiMnPO_4$) more conductive for application as a cathode, there has been little work to make them less conductive for application as an SSE. In addition, based on the band structure of $LiFePO_4$ and $LiMnPO_4$, the measured electron conductivity is very close to that of an intrinsic material, with very few thermally generated carriers, a low mobility, and with existing carriers generated by defects.

In one embodiment, the conductivity for ions in the SSE is improved by perfecting the crystal structure of the small particles from which the continuous material is fabricated, by annealing the compressed and heated powder to form a single crystal, and/or by aligning the b-axis of the crystal or crystallites perpendicular to the surface. Although improved ion conductivity is desirable, other embodiments presented do not require an improvement in either the ion conductivity or a decrease in the electron conductivity in the electrolyte (SSE) section of $LiMPO_4$ to function adequately.

In one embodiment, as schematically illustrated in FIG. 4 (in cross-section), the anode is lithium metal. During fabrication, all of the lithium is contained within the cathode (401a) and electrolyte (401b) sections of the continuous material. After the battery is assembled and charged, lithium will exit the cathode, move through the electrolyte and plate out on the top surface of the electrolyte (401b). As before, an aluminum substrate (402) was used to make contact to the cathode. Another electrode (402b) is used to make contact to the lithium metal. In one embodiment, this electrode is aluminum. In others, it is an aluminum alloy or another metal or metal alloy that is wet well by lithium. Finally, each island of battery material (cathode, SSE, and anode) is surrounded by a compliant, insulating separator material (407). Lithium wets aluminum well and also wets and diffuses though the thin layer of $Al_2O_3$ that naturally forms on the surface of the aluminum. In one embodiment, the separator material is a polymer that is also wet well by lithium metal.

It is critical that the lithium metal coats and wets the surface of electrolyte (SSE) uniformly. In the example embodiment discussed above, with a thickness of 100 μm of doped $LiFePO_4$ material as the cathode and 5 μm of undoped $LiMPO_4$ as the electrolyte, the storage capacity of the battery is 6 mA-hours per square cm. This is exciting. For a specified total capacity, a smaller area of battery surface is required. Batteries can be lighter and smaller. On the other hand, if the goal for an electric vehicle is to charge to full capacity in 15 minutes, the charging current would 24 mA per sq cm.

A current density of 24 mA per square cm may not seem that high, but for prior-art lithium batteries, this current density is higher than usual. It is especially high for those batteries built with cathodes made from an emulsion of carbon and poorly conducting $LiFePO_4$ particles in a binder.

In another embodiment, dopants are selected for the cathode section of LiFePO$_4$ to improve the ion and electron conductivity as much as possible, in order to lower the power dissipation during rapid charging. One could select elements that produced a slightly larger change in lattice parameters during charging and discharging, in return for higher conductivity. Finally, in one embodiment, a smart controller is used to raise the temperature of the battery to 80° C.-100° C., during rapid charging. Both the ion and electron conductivity of LiMPO$_4$ increase with temperature.

With a high current density, it is especially important to distribute the current uniformly across the top surface of the electrolyte. If the contact between the lithium metal anode and the electrolyte is not uniform, the current can concentrate in small areas and form hot spots. These concentrations of current and hot spots will encourage the electro-migration of lithium into the SSE, especially along any grain boundaries that may exist in a multi-crystalline material. Lithium is extremely light, extremely mobile, and has a low melting temperature (180° C.). It is easily subject to electro-migration.

Electro-migration of lithium metal will form dendrites of lithium metal that can penetrate into an SSE. Hot lithium metal can flow along grain boundaries and into voids and cracks. When the LiMPO$_4$ material expands or contracts during charge-discharge cycles, the cracks widen and lengthen. Also, lithium expands much more with temperature than LiMPO$_4$ materials. With temperature cycling, the cracks widen and lengthen. Then, more lithium metal fills the expanded crack and the crack continues to grow. Thus, lithium metal dendrites can steadily crack the SSE material and continue to penetrate until a lithium dendrite contacts the cathode section and causes a short-circuit. A short circuit of lithium metal across the SSE will allow electrons to flow directly into the cathode from the anode, without travelling through the SSE material or the external circuit.

In one embodiment, the cathode and SSE material are deposited in dry nitrogen, and/or heated for hours to drive off any carbonate, hydroxide, or other coatings on the top surface of the SSE. These coatings can interfere with ion conduction and cause hot spots to form. Finally, the clean top surface of the SSE (401b) is exposed to fluorine or HF to form a thin, protective coating of LiF (406). Metallic lithium wets LiF well and a thin layer of LiF will protect the surface of the electrolyte, while offering little resistance to the conduction of lithium ions into the electrolyte.

As above, for the example embodiment of a 100 μm thick cathode material and a 5 μm thick SSE, the battery storage capacity is 6 mA-hours per square cm. With an average discharge voltage of about 3.7 volts, this is an energy storage capacity of 22 mW-hours per square cm. With half of the 10 μm substrate aluminum layer, plus the 10 μm top aluminum layer, the total weight is 0.041 grams/cm2. The energy/weight=0.54 kWh/kg, roughly 86% of the theoretical maximum value for lithium batteries with LiFePO$_4$ cathodes.

Embodiments of the present invention create a solid-state lithium battery, in which the cathode and SSE are fabricated as a continuous solid material, with no physical separation between them. These embodiments create a lithium battery with excellent reliability and fast charging ability. They solve the fundamental issue of creating mechanically reliable, chemically stable, and highly conducting interfaces between the battery cathode, electrolyte, and anode for a solid-state battery.

The invention claimed is:

1. A lithium battery comprising:
   an anode;
   a solid cathode having a first chemical composition, wherein the first chemical composition is a first phosphate, optionally doped with a first dopant; and
   a solid electrolyte (SSE) having a second chemical composition, wherein the second chemical composition is a second phosphate, optionally doped with a second dopant, the second chemical composition being different from the first chemical composition;
   wherein the SSE overlies, and is in continuous and integral contact with, the solid cathode such that the SSE and the solid cathode form a continuous solid material with no physical separation between the solid cathode and the SSE; and
   wherein the anode overlies and is in direct contact with the solid SSE.

2. The lithium battery as in claim 1,
   wherein a major constituent of the first chemical composition comprises one or more compositions of LiM'PO$_4$, where M' comprises one or more of the following elements: Ti, V, Cr, Mn, Fe, Co, Ni, Cu, Zn; and
   wherein a major constituent of the second chemical composition comprises one or more compositions of LiM"PO$_4$, where M" comprises one or more of the following elements: Ti, V, Cr, Mn, Fe, Co, Ni, Cu, Zn.

3. The lithium battery as in claim 2,
   wherein the major constituent of the first chemical composition is LiFePO$_4$; and
   wherein the major constituent of the second composition is LiFe$_x$Mn$_{(1-x)}$PO$_4$, where 0≤x<1.

4. The lithium battery as in claim 1,
   wherein the solid cathode comprises a first layer of first particles of the first chemical composition, with an average particle dimension of 1 μm or less;
   wherein the SSE comprises a second layer of second particles of the second chemical composition, with an average particle dimension of 1 um or less; and
   wherein the first and second layers of particles are compressed and fused together to form the continuous solid material.

5. The lithium battery as in claim 4, wherein the particles of the first chemical composition are coated with a material that conducts ions and electrons, and the particles of the second chemical composition are either completely uncoated or are coated with a material that conducts ions but does not conduct electrons.

6. The lithium battery as in claim 1, further comprising an electrically insulating material separating a plurality of islands, each island comprising a block of material comprising an anode region of that island overlying an SSE region of that island, the SSE region of that island overlying a cathode region of that island overlying;
   wherein the electrically insulating material is characterized by a compliance sufficient to reduce a risk of crack formation in any of the blocks; and
   wherein the anode region of each island has a top surface co-planar with anode regions of top surfaces of each other island in the lithium battery.

7. The lithium battery as in claim 6, wherein the electrically insulating material separating the blocks is a fluorinated polymer.

8. The lithium battery as in claim 1 wherein the SSE and the solid cathode in combination either form a single crystal characterized by a b-axis that is oriented perpendicular to a top surface of the SSE, or a plurality of crystallites characterized by a b-axis that is oriented perpendicular to a top surface of the SSE.

9. The lithium battery as in claim 1 wherein the first chemical composition includes a cathode dopant comprising one element, or a combination of elements that increase the conductivity for lithium ions and/or electrons, and/or decrease the volume change, when lithium moves into or out of the material.

10. The lithium battery as in claim 9, wherein the element or elements in the cathode dopant are chosen from among elements characterized by oxidation states of $x^+$ or $x^-$ where x is any positive integer other than 2, and which contribute either holes or electrons that increase the conductivity for electrons.

11. The lithium battery as in claim 1, wherein the second chemical composition includes an SSE dopant comprising one element, or a combination of elements, that will either increase the conductivity for lithium ions, or decrease the conductivity for electrons, or increase the conductivity for lithium ions and decrease the conductivity for electrons.

12. The lithium battery as in claim 1, wherein the anode is a metallic lithium anode.

13. The lithium battery as in claim 12, additionally comprising a metal contact to the metallic lithium anode, the metal contact comprising aluminum, another metal, or a metal alloy, that is strongly wetted by lithium.

14. The lithium battery as in claim 13, wherein a surface of the SSE in contact with the metallic lithium anode is free of any carbonates, hydroxides or other contaminants, and includes a coating of LiF, of thickness no greater than a thickness corresponding to 2 atomic layers thereof, such that metallic lithium will wet the surface of the electrolyte uniformly and avoid creating current concentrations and hot spots.

\* \* \* \* \*